Nov. 3, 1931.  G. F. HOFFERBERTH  1,829,748

REFRIGERATING APPARATUS

Filed Nov. 30, 1926

Inventor
George F. Hofferberth
By Spencer, Hardman & Sehr
Attorney

Patented Nov. 3, 1931

1,829,748

UNITED STATES PATENT OFFICE

GEORGE F. HOFFERBERTH, OF DAYTON, OHIO, ASSIGNOR, BY MESNE ASSIGNMENTS, TO FRIGIDAIRE CORPORATION, A CORPORATION OF DELAWARE

REFRIGERATING APPARATUS

Application filed November 30, 1926. Serial No. 151,801.

This invention relates to refrigerating apparatus wherein a refrigerating compartment having insulated walls contains a cooling unit and is provided with a refrigerating machine disposed outside the compartment for supplying refrigerant to the cooling unit through a pipe passing through the wall.

One of the objects of the invention is to provide improved means for sealing the opening through which the refrigerant pipe passes.

Other objects will appear in the accompanying description and drawings, wherein one form of embodiment of the invention is shown.

Figure 1:
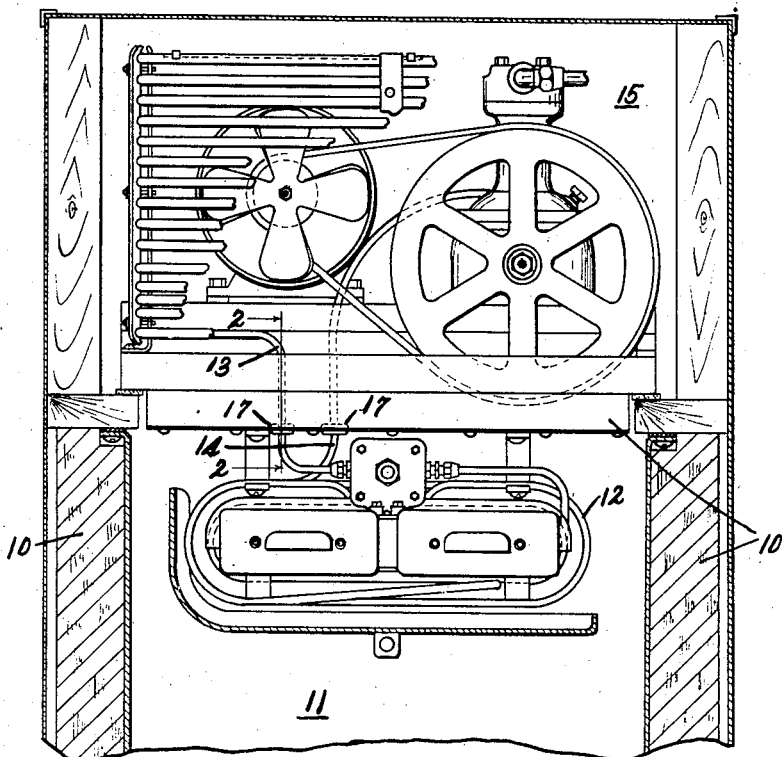
Fig. 1 is a vertical section of a household refrigerating cabinet embodying the invention.
Figure 3:
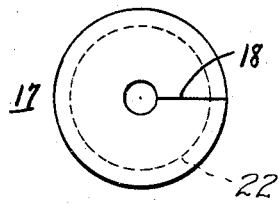
Fig. 3 is a plan view of a plug or washer.
Figure 2:
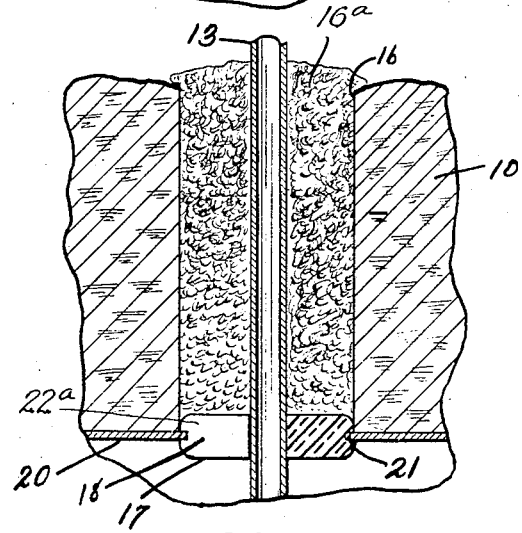
Fig. 2 is a section on the line 2—2 of Fig. 1.

The cabinet includes thick insulating walls 10 which enclose a refrigerating compartment 11, containing a cooling unit, in this case an evaporator 12. Refrigerant is supplied to the evaporator through a pipe 13 and withdrawn through a pipe 14, the refrigerant being circulated by the refrigerating machine 15 which may be placed wherever convenient.

In order that different types and sizes of cabinets can be fitted with any of various evaporators and refrigerating machines after leaving the factory, it is usual to provide holes or passages 16 through the walls 10 through which the pipes 13 and 14 can be passed.

There are various disadvantages inherent in this arrangement. The insulation is usually cork.

In the first place there is a thermal leak. Secondly, opening and shutting the doors of the cabinets causes breathing through the openings and results in exposure of the cork to the moisture in the air passing through. The moisture seriously impairs the insulating qualities of the cork and also results in giving a disagreeable cork odor to the interior of the cabinet. Thirdly, frost may collect on the pipes in the openings and furnish an additional source of supply of moisture to the cork.

Previous attempts to close the openings have proved unsatisfactory because either the means used did not seal the opening, or else the closure was not readily removable to permit replacement or moving of the apparatus.

In accordance with my invention, I pack the space around the pipe with any suitable thermal insulation 16a, preferably one which is readily removable, such as granulated cork, kapok or the like. In order to hold the insulation in place as well as to exclude moisture, I insert a plug 17 in one or both ends of the passage 16.

The plug is of resilient material, such as rubber, and is of annular form, the opening in the center fitting snugly the pipe with which it is to be used. The plug is split as shown at 18 to permit its being placed around the pipe after the latter is in place.

I prefer to construct the insulating wall with a metal lining or facing 20 having a hole registering with the passageway 16, and to provide a collar 21 adjacent the opening. This may be conveniently accomplished by making the hole in the lining smaller than the passageway 16. A peripheral groove 22 is formed in the plug, in which the collar engages when the plug is in place. This provides a collar 22a on the plug, which when the plug is in position, locks behind the collar 21 of the facing and prevents the plug from being displaced by the weight or resiliency of the insulation 16a.

This sealing means is readily removable, effectively insulates the space around the pipes, and keeps moisture out of the insulation.

While the form of embodiment of the present invention as herein disclosed, constitutes a preferred form, it is to be understood that other forms might be adopted, all coming within the scope of the claims which follow.

What is claimed is as follows:

1. In refrigerating apparatus having a refrigerating compartment, a wall having an opening through it, an impervious lining of thin material in the compartment having an opening registering with the opening in the wall, said lining having a collar adjacent the opening in the wall, a conduit for refrigerating medium extending through the openings, and means for sealing the openings comprising a plug of resilient material, the plug being provided with a groove adapted to receive the collar.

2. In refrigerating apparatus having a refrigerating compartment, a thick insulating wall having an opening through it to form a passageway, a metal lining for the wall having an opening registering with the passageway, a collar on the lining surrounding the opening, a conduit for refrigerating medium extending through said openings, insulating material filling the space between the conduit and walls of the passageway, and a resilient plug closing the end of the passageway, the plug having a groove for receiving the collar.

In testimony whereof I hereto affix my signature.

GEORGE F. HOFFERBERTH.